(12) United States Patent
Okada (10) Patent No.: US 9,223,059 B2
(45) Date of Patent: Dec. 29, 2015

(54) BENZOCYCLOBUTENE COMPOUND, ORGANIC-INORGANIC COMPOSITE PARTICLE, CROSS-LINKED ORGANIC-INORGANIC COMPOSITE PARTICLE, ORGANIC-INORGANIC COMPOSITE COMPOSITION, CROSS-LINKED ORGANIC-INORGANIC COMPOSITE COMPOSITION, AND OPTICAL DEVICE UTILIZING THE SAME

(71) Applicant: CANON KABUSHIKI KAISHA, Tokyo (JP)

(72) Inventor: Seiji Okada, New Hyde Park, NY (US)

(73) Assignee: Canon Kabushiki Kaisha, Tokyo (JP)

( * ) Notice: Subject to any disclaimer, the term of this patent is extended or adjusted under 35 U.S.C. 154(b) by 256 days.

(21) Appl. No.: 13/926,199

(22) Filed: Jun. 25, 2013

(65) Prior Publication Data

US 2014/0001423 A1 Jan. 2, 2014

(30) Foreign Application Priority Data

Jun. 27, 2012 (JP) ................................. 2012-143887

(51) Int. Cl.
*F21V 9/00* (2015.01)
*G02B 5/02* (2006.01)
*G02C 7/10* (2006.01)
*G02F 1/361* (2006.01)
*G03B 11/00* (2006.01)
*G02B 1/04* (2006.01)
*C07F 7/04* (2006.01)

(52) U.S. Cl.
CPC . *G02B 1/041* (2013.01); *G02B 1/04* (2013.01)

(58) Field of Classification Search
USPC ............ 252/582; 522/160; 525/326.5, 326.7, 525/332.1, 333.3; 548/406; 556/482; 359/355; 427/162; 526/284
See application file for complete search history.

(56) References Cited

U.S. PATENT DOCUMENTS

| 4,759,874 | A | * | 7/1988 | Gros | 252/512 |
| 5,138,081 | A | * | 8/1992 | DeVries et al. | 556/466 |
| 5,616,765 | A | * | 4/1997 | Tan et al. | 556/486 |

FOREIGN PATENT DOCUMENTS

WO   09/096253 A1   8/2009

OTHER PUBLICATIONS

Junxiao Yang, Yawen Huang and Ke Cao (2012). Recent Progress in Benzocyclobutene Related Polymers, Polymerization, Dr. Ailton De Souza Gomes (Ed.), ISBN: 978-953-51-0745-3, InTech, DOI: 10.5772/48129. Available from: http://www.intechopen.com/books/polymerization/recent-progress-in-benzocyclobutene-related-polymers.*

*Primary Examiner* — Bijan Ahvazi
(74) *Attorney, Agent, or Firm* — Canon U.S.A. Inc., IP Division (57) ABSTRACT

There is provided a benzocyclobutene compound represented by Formula (1)

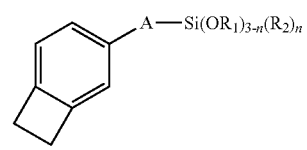

(1)

where n is an integer from 0 to 2, $R_1$ and $R_2$ are each independently selected from a hydrogen atom and a saturated hydrocarbon group having 1 to 5 carbon atoms, and A is selected from a direct bond and a substituted or unsubstituted chain saturated divalent hydrocarbon group having 1 to 20 carbon atoms.

20 Claims, 2 Drawing Sheets

BENZOCYCLOBUTENE COMPOUND, ORGANIC-INORGANIC COMPOSITE PARTICLE, CROSS-LINKED ORGANIC-INORGANIC COMPOSITE PARTICLE, ORGANIC-INORGANIC COMPOSITE COMPOSITION, CROSS-LINKED ORGANIC-INORGANIC COMPOSITE COMPOSITION, AND OPTICAL DEVICE UTILIZING THE SAME

BACKGROUND OF THE INVENTION

1. Field of the Invention

The present invention relates to a benzocyclobutene compound, organic-inorganic composite particles, cross-linked organic-inorganic composite particles, an organic-inorganic composite composition, a cross-linked organic-inorganic composite composition, and an optical device utilizing the same.

2. Description of the Related Art

Resins are light in weight, easily formed into a shape, and therefore known as being useful for forming optical members (e.g., lenses and mirrors). Such optical members are likely to be exposed to a variety of temperature environments during production and use thereof; thus, there has been a demand for development of a resin which is less likely to be thermally deformed, namely, a resin having a low linear expansion coefficient.

In general, in the field of optical members, cyclic olefin polymers which exhibit low water-absorbability and high transparency have been used as resins for forming optical members such as lenses.

There has been a high demand for a reduction in a linear expansion coefficient of a resin used for forming a high-precision optical member which provides high resolution; however, single use of a resin has a limited effect on the reduction in a linear expansion coefficient. Hence, composites of inorganic materials and resins have been intensively studied to overcome such a problem.

International Publication No. WO09/096,253 discloses an organic-inorganic composite prepared by combining a thermosetting resin with surface-treated inorganic fine particles, and the organic-inorganic composite exhibits a reduced linear expansion coefficient.

Unfortunately, a reduction in a linear expansion coefficient by the organic-inorganic composite disclosed in International Publication No. WO09/096,253 is insufficient.

SUMMARY OF THE INVENTION

The present invention provides a benzocyclobutene compound exhibiting a low linear expansion coefficient, organic-inorganic composite particles coated with the benzocyclobutene compound, cross-linked organic-inorganic composite particles prepared by cross-linking the organic-inorganic composite particles, an organic-inorganic composite composition containing such organic-inorganic composite particles and a polymer, a cross-linked organic-inorganic composite composition prepared by cross-linking such an organic-inorganic composite composition, and an optical device utilizing these materials.

A first aspect of the present invention provides a benzocyclobutene compound represented by Formula (1).

In Formula (1), n is an integer from 0 to 2, $R_1$ and $R_2$ are each independently selected from a hydrogen atom and a saturated hydrocarbon group having 1 to 5 carbon atoms, and A is selected from a direct bond and a substituted or unsubstituted chain saturated divalent hydrocarbon group having 1 to 20 carbon atoms.

A second aspect of the present invention provides an organic-inorganic composite particle containing an inorganic particle and an organic compound coating the inorganic particle, wherein the organic compound is represented by Formula (2).

In Formula (2), a is an integer from 0 to 3; b is an integer from 0 to 3; c is an integer from 1 to 3; a, b, and c are integers which satisfy the relationship of $a+b+c=3$; $R_1$ and $R_2$ are each independently selected from a hydrogen atom and a saturated hydrocarbon group having 1 to 5 carbon atoms; A is selected from a direct bond and a substituted or unsubstituted chain saturated divalent hydrocarbon group having 1 to 20 carbon atoms; and * represents a bond and is linked to the inorganic particle.

The expression "S is an integer from 0 to 3; T is an integer from 0 to 3; U is an integer from 1 to 3; and S, T, and U are integers which satisfy the relationship of $S+T+U=3$" herein used can be rephrased into "S, T, and U are integers which satisfy the relationships of $S=(0, 1, 2, 3)$, $T=(0, 1, 2, 3)$, $U=(1, 2, 3)$, and $S+T+U=3$".

A third aspect of the present invention provides a cross-linked organic-inorganic composite particle containing an inorganic particle and an organic compound coating the inorganic particle, wherein the organic compound is represented by Formula (3).

In Formula (3), a is an integer from 0 to 3; b is an integer from 0 to 3; c is an integer from 1 to 3; a, b, and c are integers which satisfy the relationship of a+b+c=3; $R_1$ and $R_2$ are each independently selected from a hydrogen atom and a saturated hydrocarbon group having 1 to 5 carbon atoms; A is selected from a direct bond and a substituted or unsubstituted chain saturated divalent hydrocarbon group having 1 to 20 carbon atoms; * represents a bond and is linked to the inorganic particle; $L_1$ and $L_2$ each independently represent a hydrogen atom or a structure represented by Formula (4); and any one of $L_1$ and $L_2$ is a structure represented by Formula (4).

(4)

In Formula (4), d is an integer from 0 to 3; e is an integer from 0 to 3; f is an integer from 1 to 3; and d, e, and f are integers which satisfy the relationship of d+e+f=3; $R_3$ and $R_4$ are each independently selected from a hydrogen atom and a saturated hydrocarbon group having 1 to 5 carbon atoms; B is selected from a direct bond and a substituted or unsubstituted chain saturated divalent hydrocarbon group having 1 to 20 carbon atoms; $*_1$ and $*_2$ each represent a bond; $*_1$ is linked to the aromatic ring in Formula (3); and $*_2$ is linked to the inorganic particle.

Further features of the present invention will become apparent from the following description of exemplary embodiments with reference to the attached drawings.

DESCRIPTION OF THE EMBODIMENTS

Embodiments of the present invention will now be described.

In Specification, N represents a nitrogen atom, O represents an oxygen atom, and Si represents a silicon atom unless otherwise specified.

First Embodiment

Benzocyclobutene Compound

A benzocyclobutene compound of a first embodiment is a compound represented by Formula (1).

(1)

In Formula (1), n is an integer from 0 to 2, $R_1$ and $R_2$ are each independently selected from a hydrogen atom and a saturated hydrocarbon group having 1 to 5 carbon atoms, and A is selected from a direct bond and a substituted or unsubstituted chain saturated divalent hydrocarbon group having 1 to 20 carbon atoms.

Examples of $R_1$ and $R_2$ that are each independently selected from a hydrogen atom and a saturated hydrocarbon group having 1 to 5 carbon atoms include a methyl group, an ethyl group, an n-propyl group, an i-propyl group, an n-butyl group, a sec-butyl group, a tert-butyl group, a pentyl group, a neopentyl group, and a cyclopentyl group. $R_1$ and $R_2$ may be the same as or different from each other and are preferably the same as each other.

The term "direct bond" herein refers to a state, for example, in which the benzocyclobutenyl group in Formula (1) is bonded to the silicon atom without any other atom interposed therebetween.

In the case where the chain saturated hydrocarbon group has a substituent, examples of the substituent include functional groups containing at least one selected from a halogen atom, an oxygen atom, a nitrogen atom, and a silicon atom.

A is selected from a direct bond and a group stable to oxidization, namely, a substituted or unsubstituted chain saturated divalent hydrocarbon group having 1 to 20 carbon atoms, and $R_1$ and $R_2$ are each independently a hydrogen atom or a saturated hydrocarbon group having 1 to 5 carbon atoms; thus, use of the benzocyclobutene compound represented by Formula (1) enables production of an optical device, such as a lens, having higher transparency as compared with a case in which A contains an unsaturated bond. This is because unsaturated bonds are reactive with oxygen and therefore cleaved by treatment with an oxidant or by high-temperature treatment with the result that ketone and aldehyde are generated and cause yellowing.

In particular, A is preferably a direct bond or an unsubstituted chain saturated divalent hydrocarbon group having 1 to 20 carbon atoms, and more preferably an unsubstituted chain saturated divalent hydrocarbon group having 1 to 10 carbon atoms.

The compound represented by Formula (1) can be synthesized by any process and may be prepared by (i) a hydrosilylation reaction of a vinyl compound containing a benzocyclobutenyl group with a silane compound or (ii) a coupling reaction of halogenated benzocyclobutene with a silane compound containing a vinyl group.

Specific examples of the compound represented by Formula (1) include (4-benzocyclobutenyl)trimethoxysilane, (4-benzocyclobutenyl)methyldimethoxysilane, (4-benzocyclobutenyl)dimethylmethoxysilane, (4-benzocyclobutenyl)triethoxysilane, (4-benzocyclobutenyl)trimethoxysilyl methane, (4-benzocyclobutenyl)triethoxysilyl methane, 1-trimethoxysilyl-2-(4-benzocyclobutenyl)ethane, 1-triethoxysilyl-2-(4-benzocyclobutenyl)ethane, 1-trimethoxysilyl-3-(4-benzocyclobutenyl)propane, and 1-triethoxysilyl-3-(4-benzocyclobutenyl)propane.

The benzocyclobutene compound of the first embodiment contains an alkoxysilyl group and therefore functions as a dispersant for inorganic particles. The benzocyclobutene compound of the first embodiment can be used for surface treatment of inorganic particles, thereby producing organic-inorganic composite particles in which inorganic particles are coated with the benzocyclobutene compound (described later).

Organic-Inorganic Composite Particles

Organic-inorganic composite particles of the first embodiment contain inorganic particles and an organic compound coating the inorganic particles, and the organic compound is represented by Formula (2).

(2)

In Formula (2), a is an integer from 0 to 3; b is an integer from 0 to 3; c is an integer from 1 to 3; a, b, and c are integers which satisfy the relationship of a+b+c=3; $R_1$ and $R_2$ are each independently selected from a hydrogen atom and a saturated hydrocarbon group having 1 to 5 carbon atoms; A is selected from a direct bond and a substituted or unsubstituted chain saturated divalent hydrocarbon group having 1 to 20 carbon atoms; and * represents a bond and is linked to the inorganic particle.

Examples of $R_1$ and $R_2$ are the same as those in Formula (1).

In the present invention and the first embodiment, the term "coating inorganic particles with an organic compound" refers to a state in which at least 50% of the surface of each inorganic particle is coated with the organic compound.

In the case where the chain saturated hydrocarbon group has a substituent, examples of the substituent include functional groups containing at least one selected from a halogen atom, an oxygen atom, a nitrogen atom, and a silicon atom.

In particular, A is preferably a direct bond or an unsubstituted chain saturated divalent hydrocarbon group having 1 to 20 carbon atoms, and more preferably an unsubstituted chain saturated divalent hydrocarbon group having 1 to 10 carbon atoms.

A is selected from a direct bond and a group stable to oxidization, namely, a substituted or unsubstituted chain saturated divalent hydrocarbon group having 1 to 20 carbon atoms, and $R_1$ and $R_2$ are each independently a hydrogen atom or a saturated hydrocarbon group having 1 to 5 carbon atoms; thus, use of the organic-inorganic composite particles of the first embodiment enables production of an optical device, such as a lens, having higher transparency as compared with a case in which any of A, $R_1$, and $R_2$ contains an unsaturated bond. This is because unsaturated bonds are reactive with oxygen and therefore cleaved by treatment with an oxidant or by high-temperature treatment with the result that ketone and aldehyde are generated and cause yellowing.

The inorganic particles can be appropriately selected from any type of inorganic particles which can enhance, for example, mechanical properties and optical properties. In view of reactivity to the compound represented by Formula (2), inorganic oxide particles may be employed. Specific examples thereof include silicon oxide, aluminum oxide, titanium oxide, niobium oxide, tantalum oxide, zirconium oxide, zinc oxide, magnesium oxide, tellurium oxide, yttrium oxide, indium oxide, tin oxide, lithium niobate, potassium niobate, and lithium tantalate. Furthermore, inorganic particles having a core-shell structure in which the outer surfaces of inorganic or organic particles are coated with another inorganic component can be used, or hollow inorganic particles can be used. The inorganic particles may have any shape such as a spherical shape, an elliptical shape, a flat shape, or a rod shape.

The average primary particle size of the inorganic particles is not more than 10 µm, and preferably not more than 100 nm. For example, in the case where the organic-inorganic composite particles are used for forming optical materials, an average primary particle size greater than 100 nm increases scattering of the inorganic particles with the result that the transparency of the optical materials is reduced; thus, an average primary particle size of not more than 100 nm may be employed.

The organic content in the organic-inorganic composite particles is not specifically limited provided that intended mechanical properties, electrical properties, and optical properties can be obtained; the organic content is preferably in the range of 5 weight % to 80 weight %, and more preferably 5 weight % to 50 weight % relative to the weight of the organic-inorganic composite particles. At not less than 5 weight % of the organic content, benzocyclobutenyl groups bonded to the surfaces of the organic-inorganic composite particles effectively serve as cross-linking points, so that a cross-linked organic-inorganic composite particles and cross-linked organic-inorganic composite composition (described later) can sufficiently provide the effect of the present invention. At not more than 80 weight % of the organic content, the excellent properties (e.g., mechanical properties) of the inorganic particles can be prevented from being impaired by organic materials.

The organic-inorganic composite particles of the first embodiment contain benzocyclobutenyl groups which are thermally crosslinkable and present on the surfaces of the inorganic particles; hence, the organic-inorganic composite particles of the first embodiment can be heated to produce cross-linked organic-inorganic composite particles which will be described later.

Method for Producing Organic-Inorganic Composite Particles

The above-mentioned organic-inorganic composite particles can be produced through a process which involves adding the above-mentioned inorganic particles to, for instance, an organic solvent, adding the above-mentioned benzocyclobutene compound and optionally a dispersion aid (in the case where both components are contained, these components are hereinafter correctively referred to as "dispersant") to the resulting solution, and bonding the inorganic particles, the benzocyclobutene compound, and the dispersion aid to each other (hereinafter referred to as a surface modification process). The inorganic particles used in this case may be in the form of a solid or a sol in which the inorganic particles are dispersed in a liquid. The surface modification process can be carried out by, for instance, techniques involving use of ultrasonic waves, bead mills, ball mills, jet mills, and stirring.

Any organic solvent in which the above-mentioned compound can be dissolved can be used as the organic solvent. Examples of such an organic solvent include solvents containing aliphatic hydrocarbons such as pentane, hexane, heptane, decane, and cyclohexane; solvents containing aromatic hydrocarbons such as benzene, toluene, and xylene; solvents containing ketones such as methyl ethyl ketone, methyl isobutyl ketone, and cyclohexanone; solvents containing cyclic ethers such as tetrahydrofuran and dioxane; and halogen-containing solvents such as chloroform, 1,2-dichloroethane, methylene chloride, carbon tetrachloride, trichloroethylene, tetrachloroethylene, chlorobenzene, tetrachloroethane, and bromobenzene. These solvents may be used alone or in combination of two or more.

The dispersion liquid containing the organic-inorganic composite particles of the first embodiment may contain a dispersion aid, thereby enhancing the dispersibility of the organic-inorganic composite particles in the organic solvent or another material. Any dispersion aid having a functional group which can be bonded to the inorganic particles and exhibiting solubility in the organic solvent used in the surface modification process can be employed in the first embodiment.

Examples of the functional group which can be bonded to the inorganic particles include a carboxylic acid group, an acyl halide group, a sulfonic acid group, a sulfinic acid group, a phosphoric acid group, a phosphoric acid group, a phosphinic acid group, an amino group, an amide group, a thiol group, an alkoxysilyl group, a silyl halide group, an alkoxytitanyl group, and a titanyl halide group. Among these functional groups, an alkoxysilyl group may be used in view of availability.

Specific examples of the alkoxysilyl group include a methyl trimethoxysilyl group, a dimethyldimethoxysilyl group, a trimethylmethoxysilyl group, an n-propyltrimethoxysilyl group, an n-butyltriethoxysilyl group, an n-hexyltrimethoxysilyl group, an n-hexyltriethoxysilyl group, an n-octyltriethoxysilyl group, an n-decyltrimethoxysilyl group, a cyclopentyltrimethoxysilyl group, a phenyltrimethoxysilyl group, and a diphenyldimethoxysilyl group.

The amount of the inorganic particles used in the surface modification process may be from 1 weight % to 50 weight % relative to the weight of the organic solvent. In other words, in the case where 100 g of the organic solvent is used, the amount of the inorganic particles may be not less than 1 g that is equal to 1% of 100 g and not more than 50 g that is equal to 50% of 100 g. In the following description, the same holds true for the meaning of the term "weight %". In the case where the amount of the inorganic particles is not less than 1 weight %, the yield of the organic-inorganic composite particles is increased; in the case where the amount of the inorganic particles is not more than 50 weight %, the efficiency with which the surfaces of the inorganic particles are modified by the compound and dispersion aid can be prevented from being decreased due to an increase in the viscosity of a reaction solution, which can reduce a time taken for the surface modification.

The amount of the dispersant used in the surface modification process may be not less than 10 weight % relative to the weight of the inorganic particles. In the case where the amount of the dispersant is not less than 10 weight %, the surfaces of the inorganic particles can efficiently react with the dispersant, which enables the organic-inorganic composite particles to be readily dispersed in an organic solvent or another material. The benzocyclobutene compound content in the dispersant may be not less than 10 weight % relative to the weight of the dispersant. At not less than 10 weight % of the benzocyclobutene compound content, an effect in which a linear expansion coefficient is decreased in cross-linked organic-inorganic composite particles and a cross-linked organic-inorganic composite composition (described later) can be enhanced.

In order to enhance the reactivity of the inorganic particles to the compound and the dispersion aid, an acid or a base may be added (hereinafter referred to as "additive"). Any additive can be used provided that the inorganic particles are not dissolved therein. Specific examples of the additive include hydrochloric acid, sulfuric acid, nitric acid, organic carboxylic acid compounds, organic sulfonic acid compounds, ammonia (including ammonia aqueous solution), organic amine compounds, and hydroxides of alkali metals or alkaline-earth metals, such as sodium hydroxide and potassium hydroxide. The amount of the additive is preferably in the range of 0.01 weight % to 20 weight %, and more preferably 0.1 weight % to 10 weight % relative to the weight of the dispersant. In the case where the amount of the additive is not less than 0.01 weight %, the reactivity of the inorganic particles to the compound and the dispersion aid is enhanced. In the case where the amount of the additive is not more than 20 weight %, the additive can be readily removed after the surface modification process.

In the case where the above-mentioned organic solvent is used in the surface modification process, the organic-inorganic composite particles are in a dispersed state in the organic solvent; however, the organic-inorganic composite particles in the form of a solid can be produced by evaporating the organic solvent or by adding another organic solvent which exhibits compatibility with the above-mentioned organic solvent and which enables agglomeration of the organic-inorganic composite particles (reprecipitation technique).

Furthermore, a purifying process can be optionally carried out, in which the compound and dispersion aid not bonded to the surface of the organic-inorganic composite particles are removed. Examples of a purification technique include, but are not limited to, techniques involving ultrafiltration, centrifugal separation, and reprecipitation.

Cross-Linked Organic-Inorganic Composite Particles

Cross-linked organic-inorganic composite particles of the first embodiment contain inorganic particles and an organic compound coating the inorganic particles, and the organic compound is represented by Formula (3).

(3)

In Formula (3), a is an integer from 0 to 3; b is an integer from 0 to 3; c is an integer from 1 to 3; a, b, and c are integers which satisfy the relationship of $a+b+c=3$; $R_1$ and $R_2$ are each independently selected from a hydrogen atom and a saturated hydrocarbon group having 1 to 5 carbon atoms; A is selected from a direct bond and a substituted or unsubstituted chain saturated divalent hydrocarbon group having 1 to 20 carbon atoms; * represents a bond and is linked to the inorganic particle; $L_1$ and $L_2$ each independently represent a hydrogen atom or a structure represented by Formula (4); and any one of $L_1$ and $L_2$ is a structure represented by Formula (4).

(4)

In Formula (4), d is an integer from 0 to 3; e is an integer from 0 to 3; f is an integer from 1 to 3; and d, e, and f are integers which satisfy the relationship of d+e+f=3; $R_3$ and $R_4$ are each independently selected from a hydrogen atom and a saturated hydrocarbon group having 1 to 5 carbon atoms; B is selected from a direct bond and a substituted or unsubstituted chain saturated divalent hydrocarbon group having 1 to 20 carbon atoms; and $*_1$ and $*_2$ each represent a bond; $*_1$ is linked to the aromatic ring in Formula (3), and $*_2$ is linked to the inorganic particle.

Examples of $R_1$ and $R_2$ are the same as those in Formula (1).

Examples of $R_3$ and $R_4$ are the same as examples of $R_1$ and $R_2$ in Formula (1). $R_3$ and $R_4$ may be the same as or different from each other and are preferably the same as each other.

In the case where the chain saturated hydrocarbon group has a substituent, examples of the substituent include functional groups containing at least one selected from a halogen atom, an oxygen atom, a nitrogen atom, and a silicon atom.

Figure 1:
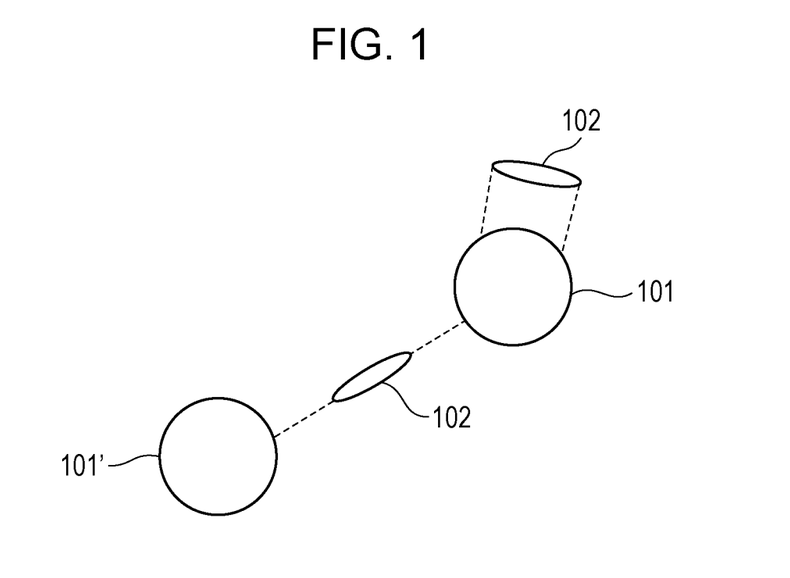
FIG. 1 schematically illustrates cross-linked organic-inorganic composite particles according to an embodiment of the present invention.

FIG. 1 schematically illustrates the cross-linked organic-inorganic composite particles of the first embodiment. In FIG. 1, symbols 101 and 101' indicate inorganic particles and may indicate the same inorganic particle or different inorganic particles. A symbol 102 indicates the organic compound which is represented by Formula (3) and which coats the inorganic particles, and dashed lines indicate bonds in Formulae (3) and (4). As schematically illustrated in FIG. 1, the bond * in Formula (3) and the bond $*_2$ in Formula (4) may be linked to the same inorganic particle or linked to different inorganic particles; in addition, these bonds may be linked to different types of inorganic particles.

In the case where the chain saturated hydrocarbon group has a substituent, examples of the substituent include functional groups containing at least one selected from a halogen atom, an oxygen atom, a nitrogen atom, and a silicon atom.

In particular, A and B are each preferably a direct bond or an unsubstituted chain saturated divalent hydrocarbon group having 1 to 20 carbon atoms, and more preferably an unsubstituted chain saturated divalent hydrocarbon group having 1 to 10 carbon atoms.

A and B are each selected from a direct bond and a group stable to oxidization, namely, a substituted or unsubstituted chain saturated divalent hydrocarbon group having 1 to 20 carbon atoms, and $R_1$ to $R_4$ are each independently a hydrogen atom or a saturated hydrocarbon group having 1 to 5 carbon atoms; thus, use of the cross-linked organic-inorganic composite particles of the first embodiment enables production of an optical device, such as a lens, having higher transparency as compared with a case in which any of A, B, $R_1$, $R_2$, $R_3$, and $R_4$ contains an unsaturated bond. This is because unsaturated bonds are reactive with oxygen and therefore cleaved by treatment with an oxidant or by high-temperature treatment with the result that ketone and aldehyde are generated and cause yellowing.

In the cross-linked organic-inorganic composite particles of the first embodiment, inorganic particles are bonded to each other via a cross-linked structure [namely, structure represented by Formula (3)]; hence, the cross-linked organic-inorganic composite particles exhibit a sufficiently low linear expansion coefficient, enable a reduction in a dimensional change which occurs due to heating, and can be used as a material of optical devices or in other applications.

The cross-linked structure of the cross-linked organic-inorganic composite particles of the first embodiment can be identified by known methods. In particular, the cross-linked structure of the cross-linked organic-inorganic composite particles can be identified as follows: the cross-linked particles are analyzed by infrared spectrometry (IR) to observe the absorption peak around a wavenumber of 1470 $cm^{-1}$ which is derived from a benzocyclobutene skeleton and which varies before and after a cross-linking reaction and the absorption peak around a wavenumber of 1500 $cm^{-1}$ which appears after the cross-linking reaction.

The linear expansion coefficient of the cross-linked organic-inorganic composite particles of the first embodiment can be adjusted on the basis of a percentage of cross-linking in the cross-linked organic-inorganic composite particles of the first embodiment. In particular, an increase in a percentage of cross-linking in the cross-linked organic-inorganic composite particles of the first embodiment leads to a reduction in a linear expansion coefficient; a decrease in a percentage of the cross-linking leads to an increase in a linear expansion coefficient. A percentage of cross-linking in the cross-linked organic-inorganic composite particles of the first embodiment is not specifically limited because a desired linear expansion coefficient varies depending on applications thereof; however, in the case where the cross-linked organic-inorganic composite particles of the first embodiment are used for forming optical devices, such as a lens, a percentage of cross-linking in the cross-linked organic-inorganic composite particles of the first embodiment is preferably not less than 50%, and more preferably not less than 80% because production of optical devices needs use of a material exhibiting a low linear expansion coefficient.

Method for Producing Cross-Linked Organic-Inorganic Composite Particles

A method for producing the cross-linked organic-inorganic composite particles of the first embodiment, for instance, involves cross-linking of the above-mentioned organic-inorganic composite particles by heating and/or microwave irradiation thereof.

Heating can be carried out at any temperature at which the cyclobutene ring of the benzocyclobutene structure contained in the organic-inorganic composite particles can open; preferably 180° C. to 400° C., and more preferably 200° C. to 300° C. At the cross-linking temperature of not less than 180° C., the organic-inorganic composite particles are sufficiently cross-linked, which leads to an enhancement in an effect of the present invention in which a linear expansion coefficient is sufficiently decreased. At the cross-linking temperature of not more than 400° C., the pyrolysis of an organic component contained in the cross-linked organic-inorganic composite particles can be reduced.

The microwave irradiation can be carried out at any microwave frequency which enables the cyclobutene ring of the benzocyclobutene structure contained in the organic-inorganic composite particles to open; the cross-linked organic-inorganic composite particles are formed by exposure to microwave radiation at a frequency of 2.45 GHz or 5.8 GHz. These microwave frequencies indicate a frequency of 2,450±50 MHz corresponding to a 2.45 GHz band and a frequency of 5,800±75 MHz corresponding to a 5.8 GHz band in accordance with the Industry-Science-Medical (ISM) band, respectively. The microwave irradiation may be carried out several times under different conditions. The microwave irradiation can be carried out at any temperature; preferably 50° C. to 400° C., more preferably 80° C. to 300° C., and especially preferably 100° C. to 200° C.

The heating and microwave irradiation may be carried out at the same time or in sequence (either one may be first carried out).

The time over which the heating and microwave irradiation are performed is not specifically limited provided that the cross-linking reaction is carried out; it may be 1 minute to 10 hours. At a cross-linking time less than 1 minute, a cross-linking reaction may be insufficient with the result that the effect of the present invention is not sufficiently provided in some cases; at a cross-linking time more than 10 hours, productivity may be reduced. In the case where heating is employed for a cross-linking process, long-term heating at high temperature degrades cross-linked products.

In order to prevent oxidative degradation of an organic component contained in the cross-linked organic-inorganic composite particles of the present invention, the heating and/or microwave irradiation may be carried out under an inert atmosphere such as an argon, helium, or nitrogen atmosphere.

The inorganic content in the cross-linked organic-inorganic composite particles of the present invention relative to the total weight thereof is not specifically limited provided that intended mechanical properties, electrical properties, and optical properties can be obtained; the inorganic content may be in the range of 10 weight % to 80 weight % relative to the weight of the cross-linked organic-inorganic composite particles. At an inorganic content less than 10 weight %, the inorganic content in the cross-linked organic-inorganic composite particles is low with the result that intended properties are not obtained in some cases. At the inorganic content greater than 80 weight %, for example, the organic content in the cross-linked organic-inorganic composite particles of the present invention is insufficient, for example, to produce products from the cross-linked organic-inorganic composite particles of the present invention, and the production of products therefore becomes difficult in some cases.

The cross-linked organic-inorganic composite particles of the first embodiment can optionally contain resin additives generally used, such as an antioxidant, a neutralizing agent, a lubricant, an antistatic agent, a whitening agent, a heat stabilizer, a light stabilizer, a plasticizer, a colorant, an impact modifier, an extender, a mold-release agent, a foaming agent, and a processing aid. Specific examples of such additives include additives found in R. Gachter; H. Muller. *Plastics Additives Handbook*, 4th edition; 1993.

The cross-linked organic-inorganic composite particles of the first embodiment may contain a filler to improve the mechanical properties, electrical properties, and optical properties thereof. Any filler can be used; it may be an inorganic material or an organic material.

The inorganic filler may be a silicon oxide, a metal oxide, a carbon compound, a metal multiple oxide, a metal sulfide, a metal compound semiconductor, or a metal. Examples of the metal oxide include aluminum oxide, titanium oxide, niobium oxide, tantalum oxide, zirconium oxide, zinc oxide, magnesium oxide, tellurium oxide, yttrium oxide, indium oxide, tin oxide, and indium tin oxide. Examples of the carbon compound include diamond, carbon nanotubes, graphite, and fullerene. Examples of the metal multiple oxide include lithium niobate, potassium niobate, and lithium tantalate. Examples of the metal compound semiconductor include metal sulfides, such as zinc sulfide and cadmium sulfide, zinc selenide, cadmium selenide, zinc telluride, and cadmium telluride. An example of the metal is gold. A core-shell inorganic material in which an inorganic material is coated with another inorganic component may be used. The inorganic material may have any shape such as a spherical shape, an elliptical shape, a flat shape, or a rod shape.

Examples of the organic filler include wood flour, starch, organic pigments, thermoplastic resins, thermosetting resins, elastomers, and waste plastics.

In addition to the above-mentioned inorganic and organic materials, stable fibers or continuous fibers, such as chopped strands and milled fibers, can be used as the filler. Examples of the fibers include inorganic fibers such as glass fibers, carbon fibers, and metal fibers; and organic fibers such as aramid fibers, nylon fibers, jute fibers, kenaf fibers, bamboo fibers, polyethylene fibers, drawn polyethylene fibers, polypropylene fibers, and drawn polypropylene fibers.

The filler may be a flame retardant. Examples of the flame retardant include flame retardants containing inorganic materials such as metal hydroxides, and flame retardants containing organic materials such as phosphorus-containing compounds, halogen-containing compounds, and nitrogen-containing compounds. Among these, flame retardants containing metal hydroxides may be employed in terms of a reduced load on the environment. Examples of the flame retardants containing metal hydroxides include aluminum hydroxide, magnesium hydroxide, basic magnesium oxide, and dawsonite.

Organic-Inorganic Composite Composition

An organic-inorganic composite composition of the first embodiment contains the above-mentioned organic-inorganic composite particles and a polymer having a repeating unit represented by any of Formulae (5) to (14).

(5)

(6)

(7)

(8)

(9)

(10)

(11)

(12)

(13)

(14)

Formulae (5) to (14) each represent a repeating unit of a polymer, where $R_5$ to $R_8$ and $R_{10}$ and $R_{11}$ are each independently selected from a hydrogen atom and a hydrocarbon group having 1 to 20 carbon atoms; in this case, at least one of $R_5$ to $R_8$, $R_9$, and at least one of $R_{10}$ and $R_{11}$ are each represented by Formula (15); and s, t, and u are each independently an integer of 0 or 1.

(15)

In Formula (15), C is selected from a direct bond and a substituted or unsubstituted chain saturated divalent hydrocarbon group having 1 to 20 carbon atoms, and * represents a bond and is linked to the repeating unit represented by any of Formulae (5) to (14).

Examples of the hydrocarbon group having 1 to 20 carbon atoms include alkyl groups, alkenyl groups, and aryl groups. Specific examples thereof include a methyl group, an ethyl group, an n-propyl group, an i-propyl group, an n-butyl group, a sec-butyl group, a tert-butyl group, a pentyl group, a neopentyl group, a hexyl group, an octyl group, a decyl group, a cyclopentyl group, a cyclohexyl group, a vinyl group, an ethylidene group, a phenyl group, a benzyl group, a biphenyl group, and a naphthyl group.

C is preferably a direct bond or an unsubstituted chain saturated divalent hydrocarbon group having 1 to 20 carbon atoms, and more preferably an unsubstituted chain saturated divalent hydrocarbon group having 1 to 10 carbon atoms.

In the case where the chain saturated hydrocarbon group has a substituent, examples of the substituent include functional groups containing at least one selected from a halogen atom, an oxygen atom, a nitrogen atom, and a silicon atom.

The polymer can have any molecular weight; the weight-average molecular weight (Mw) of the polymer is from 500 to 1000000, and preferably from 1000 to 500000. The molecular weight is a value determined by gel permeation chromatography (GPC) on a polystyrene basis.

The organic-inorganic composite particle content in the organic-inorganic composite composition of the first embodiment is not specifically limited provided that intended mechanical properties, electrical properties, and optical properties can be obtained; the organic-inorganic composite particle content may be in the range of 1 weight % to 99 weight %, and preferably 20 weight % to 80 weight % relative to the weight of the organic-inorganic composite composition of the first embodiment. At an organic-inorganic composite particle content less than 1 weight %, the inorganic content in the organic-inorganic particle is low with the result that intended properties are not obtained in some cases.

The content of the polymer having the repeating unit represented by any of Formulae (5) to (14) in the organic-inorganic composite composition of the first embodiment is in the range of 1 weight % to 99 weight %, and preferably 20 weight % to 80 weight % relative to the weight of the organic-inorganic composite composition of the first embodiment. In the case where the polymer having the repeating unit represented by any of Formulae (5) to (14) contains an unsaturated bond, the polymer content may be not more than 20 weight % relative to the weight of the organic-inorganic composite composition of the first embodiment. If the polymer having the repeating unit represented by any of Formulae (5) to (14) contains an unsaturated bond and where the organic-inorganic composite composition of the first embodiment containing such a polymer is used to produce optical devices, such as a lens, the unsaturated bond is cleaved by treatment with an oxidant or by high-temperature treatment with the result that ketone and aldehyde may be generated and cause yellowing as described above.

The organic-inorganic composite composition of the first embodiment contains benzocyclobutenyl groups which are thermally crosslinkable and present both on the surfaces of the inorganic particles and in the polymer structure; hence, the organic-inorganic composite composition of the first embodiment can be heated to produce a cross-linked organic-inorganic composite composition which will be described later.

Method for Producing Organic-Inorganic Composite Composition

The organic-inorganic composite composition of the first embodiment can be produced by mixing the above-mentioned organic-inorganic composite particles with the polymer having the repeating unit represented by any of Formulae (5) to (14). Examples of a method for producing the organic-inorganic composite composition of the first embodiment include a method involving kneading the above-mentioned organic-inorganic composite particles and the polymer with a melt kneader under application of a shearing force and a method involving mixing the organic-inorganic composite particles with the polymer in an organic solvent and then reprecipitating the product in a poor solvent.

For the same purpose as described in "Cross-linked Organic-inorganic Composite Particles", the organic-inorganic composite composition of the first embodiment can optionally contain the above-mentioned additives and fillers.

Cross-Linked Organic-Inorganic Composite Composition

A cross-linked organic-inorganic composite composition of the first embodiment is prepared by cross-linking the above-mentioned organic-inorganic composite composition.

The cross-linked organic-inorganic composite composition may be prepared by cross-linking the benzocyclobutenyl moieties of the organic-inorganic composite composition and may be represented by any of Formulae (16) to (25), the benzocyclobutenyl moieties being thermally crosslinkable.

(16)

(17)

(18)

(19)

(20)

(21)

(22)

(23)

(24)

(25)

In Formulae (16) to (25), $R_{12}$ to $R_{15}$ and $R_{17}$ and $R_{18}$ are each independently selected from a hydrogen atom, a halogen atom, a hydrocarbon group which optionally contains a substituent and which has 1 to 20 carbon atoms, and a substituent containing a silicon atom, an oxygen atom, or a nitrogen atom; in this case, at least one of $R_{12}$ to $R_{15}$, $R_{16}$, and at least one of $R_{17}$ and $R_{18}$ are each a structure represented by Formula (26); and x, y, and z are each independently an integer of 0 or 1.

(26)

In Formula (26), D is selected from a direct bond and a substituted or unsubstituted chain saturated divalent hydrocarbon group having 1 to 20 carbon atoms, * represents a bond and is linked to the repeating unit represented by any of Formulae (16) to (25), $L_3$ and $L_4$ each independently represent a hydrogen atom or a structure represented by Formula (27), and any one of $L_3$ and $L_4$ is the structure represented by Formula (27).

(27)

In Formula (27), g is an integer from 0 to 3; h is an integer from 0 to 3; i is an integer from 1 to 3; g, h, and i are integers which satisfy the relationship of g+h+i=3; $R_{19}$ and $R_{20}$ are each independently selected from a hydrogen atom and a saturated hydrocarbon group having 1 to 5 carbon atoms; E is selected from a direct bond and a substituted or unsubstituted chain saturated divalent hydrocarbon group having 1 to 20 carbon atoms; $*_3$ and $*_4$ each represent a bond; $*_3$ is linked to the aromatic ring in Formula (26); and $*_4$ is linked to the inorganic particle.

Examples of the saturated hydrocarbon group having 1 to 5 carbon atoms include a methyl group, an ethyl group, an n-propyl group, an i-propyl group, an n-butyl group, a sec-butyl group, a tert-butyl group, a pentyl group, a neopentyl group, and a cyclopentyl group. $R_{19}$ and $R_{20}$ may be the same as or different from each other and are preferably the same as each other.

Examples of the hydrocarbon group having 1 to 20 carbon atoms include alkyl groups, alkenyl groups, and aryl groups. Specific examples thereof include a methyl group, an ethyl group, an n-propyl group, an i-propyl group, an n-butyl group, a sec-butyl group, a tert-butyl group, a pentyl group, a neopentyl group, a hexyl group, an, octyl group, a decyl group, a cyclopentyl group, a cyclohexyl group, a vinyl group, an ethylidene group, a phenyl group, a benzyl group, a biphenyl group, and a naphthyl group.

In particular, D and E are each preferably a direct bond or an unsubstituted chain saturated divalent hydrocarbon group having 1 to 20 carbon atoms, and more preferably an unsubstituted chain saturated divalent hydrocarbon group having 1 to 10 carbon atoms.

In the case where the chain saturated hydrocarbon group has a substituent, examples of the substituent include functional groups containing at least one selected from a halogen atom, an oxygen atom, a nitrogen atom, and a silicon atom.

The inorganic content in the cross-linked organic-inorganic composite composition is not specifically limited provided that intended mechanical properties, electrical properties, and optical properties can be obtained; the inorganic content may be not less than 10 weight % relative to the weight of the cross-linked organic-inorganic composite composition. At the inorganic content less than 10 weight %, the inorganic content in the cross-linked organic-inorganic composite composition is low with the result that intended properties are not obtained in some cases. The inorganic content includes the inorganic particle content and the inorganic filler content.

The cross-linked organic-inorganic composite composition of the first embodiment has cross-linked structures between polymers and between a polymer and an inorganic particle; hence, the cross-linked organic-inorganic composite composition exhibits a sufficiently low linear expansion coefficient, enables a reduction in a dimensional change which occurs due to heating, and can be used as a material of optical devices or in other applications.

The cross-linked structure of the cross-linked organic-inorganic composite composition of the first embodiment can be identified by the same method as described in "Cross-linked Organic-inorganic Composite Particles".

A percentage of cross-linking in the cross-linked organic-inorganic composite composition of the first embodiment may be not less than 50% for the same reason as described in "Cross-linked Organic-inorganic Composite Particles".

Method for Producing Cross-Linked Organic-Inorganic Composite Composition

A method for producing the cross-linked organic-inorganic composite composition of the first embodiment, for instance, involves cross-linking of the above-mentioned organic-inorganic composite composition by heating and/or microwave irradiation thereof. A specific technique is the same as described in "Cross-linked Organic-inorganic Composite Particles".

For the same purpose as described in "Cross-linked Organic-inorganic Composite Particles", the cross-linked organic-inorganic composite composition of the first embodiment can optionally contain the above-mentioned additives and fillers.

Second Embodiment

Optical Device

An optical device will be described in a second embodiment of the present invention. The optical device of the second embodiment includes the above-mentioned optical material formed in a shape and having an optical surface. Examples of the optical device include optical lenses and optical prisms, such as image-pick-up lenses of cameras, lenses used in microscopes, endoscopes, and telescopes, and all-optical transmitting lens (e.g., spectacle lenses); optical applications such as pickup lenses for optical disks, e.g., compact discs (CDs), compact disc read only memories (CD-ROMs), recordable optical discs (WORMs), magneto-optical discs (MOs, rewritable optical disc), mini-discs (MDs), and digital video discs (DVDs); lenses used in optical scanning systems, such as lenses for laser scanning systems, e.g., fθ lenses used in laser beam printers and lenses used for sensors; and prism lenses used in finder systems of cameras. Examples of other optical applications include light guide plates used in, for example, liquid crystal displays; optical films such as polarizing films, retardation films, and optical diffusion films; optical diffusion plates; optical cards; and substrates used in liquid crystal display devices.

Among these examples, the optical device of the second embodiment may be in the form of a lens. A lens may have a surface on which an antireflection film is formed or may have an intermediate layer formed between such an antireflection film and the lens. Although any antireflection film can be used, an antireflection film exhibiting a refractive index close to that of a lens may be employed. Although any intermediate layer can be used, an intermediate layer may be formed from a material having a refractive index that is between those of a lens and antireflection film. The term "surface of a lens" refers to a side of a lens; an antireflection film may be formed on every side of a lens or may be formed on some sides thereof or part of a side thereof, and an antireflection film is preferably formed at least on the principal plane of a lens.

Method for Producing Optical Device

An example of a method for producing an optical device formed from the above-mentioned cross-linked organic-inorganic composite particles or cross-linked organic-inorganic composite composition will be described. A method for producing the optical device, for instance, involves preparing the above-mentioned organic-inorganic composite particles or organic-inorganic composite composition, forming the organic-inorganic composite particles or organic-inorganic composite composition into a shape, and then cross-linking the product.

Any technique can be used for forming the material into a shape, and a technique suitable for shaping an intended optical device may be employed. Examples of such a technique include injection molding, transfer molding, blow molding, rotational molding, vacuum forming, extrusion molding, calendering, solution casting, heat press forming, inflation, and solvent casting.

The same cross-linking technique as described in "Method for Producing Cross-linked Organic-inorganic Composite Particles" may be employed.

The optical device may be used in a variety of forms such as a sphere, a rod, a plate, a cylinder, a pipe, a tube, a fiber, a film, and a sheet.

A method for producing an optical lens as an example of the optical device will now be described.

An optical lens can be produced through a process for forming the above-mentioned composite particles or composite composition into the intended shape of a lens and a process for cross-linking the shaped product.

Any technique can be used for forming the material into the shape of a lens, and a melt process may be employed to produce a shaped product having excellent properties such as low birefringence, high mechanical strength, and high dimensional accuracy. Examples of the melt process include commercially available press forming, commercially available extrusion molding, and commercially available injection molding. Injection molding enables easy molding, gives high productivity, and therefore may be employed. The forming conditions are appropriately determined on the basis of an intended use or a forming method; in the case of injection molding, the temperature of a polymer is not limited provided that a cross-linking reaction of the polymer does not progress. The temperature may be in the range of 100° C. to 300° C. In addition, the forming process may be carried out in an inert gas or under vacuum. In the temperature range described above, the composition has appropriate flowability during the forming process, and the shaped product is less likely to have sink marks or strain, has the reduced number of silver streaks which occur due to the thermal decomposition of the polymer, and is resistant to yellowing. In an inert gas or under vacuum, the degradation and yellowing of the shaped product can be significantly reduced.

In the process for cross-linking the shaped product, the composition which has been injected into a lens-shaped forming die is heated to a temperature higher than the temperature at which the cyclobutene ring of the benzocyclobutene structure contained in the above-mentioned composite particles or composite composition opens. The temperature is preferably from 180° C. to 400° C., and more preferably 200° C. to 300° C. The process for cross-linking the shaped product may be carried out for any length of time which enables the composite particles or composite composition to be cross-linked. The time may be from 1 minute to 10 hours. A cross-linking time less than 1 minute may result in insufficient cross-linking, which may reduce the effects of the present invention. A cross-linking time more than 10 hours may result in low productivity or the degradation of the cross-linked product. In the cross-linking process, the pressure may be optionally applied to a forming die. The pressure is generally in the range of 0.1 MPa to 50 MPa and preferably in the range of 3 MPa to 20 MPa. In addition, the cross-linking process may be carried out in an inert gas or under vacuum. An excessively low cross-linking temperature results in insufficient cross-linking and is less likely to lead to a sufficiently low linear expansion coefficient. An excessively high cross-linking temperature results in thermal degradation of the composition and cross-linked product. In an inert gas or under vacuum, the degradation and yellowing of the cross-linked product can be significantly reduced.

Examples

The present invention will now be described in detail with reference to Examples; however, the present invention is not limited thereto. In the manner described below, a compound and a cross-linked structure were identified; and the molar ratio of repeating units contained in a polymer, a number-average molecular weight (Mn), a weight-average molecular weight (Mw), a linear expansion coefficient, a percentage of cross-linking, the volume-average particle size of particles, and the weight fraction of the organic material in a sample were measured.

1. Compound Identification and Molar Ratio of Repeating Units Contained in Polymer In 1.1 g of $CDCl_3$, 15 mg of a sample was dissolved, and the resulting solution was subjected to $^1H$-NMR measurement with a nuclear magnetic resonance apparatus JNM-ECA-400 (manufactured by JEOL Ltd.).

2. Number-Average Molecular Weight (Mn) and Weight-Average Molecular Weight (Mw)

A number-average molecular weight (Mn) and a weight-average molecular weight (Mw) were measured at 40° C. with a gel permeation chromatography (GPC) apparatus (manufactured by Waters Corporation) using two Shodex LF-804 columns (manufactured by Showa Denko K.K.) disposed in series, THF as an developing solvent, and a differential refractive index (RI) detector. The obtained number-average molecular weight (Mn) and weight-average molecular weight (Mw) were in terms of standard polystyrene.

3. Linear Expansion Coefficient

In accordance with a testing method of a linear expansion coefficient of plastics by a thermomechanical analysis (JIS K 7197), a hardened product was cut into a strip of test specimen having a length of 1 cm, the test specimen was placed in a thermomechanical analysis apparatus (Thermo Plus EVO TMA8310 manufactured by Rigaku Corp.) and was subjected to two cycles of heating and cooling between −40° C. and 150° C. at a heating rate of 5° C./min in a nitrogen stream (100 mL/min), and the average linear expansion coefficient at a temperature of 0° C. to 40° C. was measured during heating in the second cycle.

4. Cross-Linked Structure Identification

A cross-linked product was analyzed with a Fourier transform infrared spectrometer (Spectrum One manufactured by PerkinElmer, Inc.) by an attenuated total reflection (ATR) method, and the cross-linked structure of the cross-linked product was identified by observing a decrease in the absorption peak around a wavenumber of 1470 cm$^{-1}$ and an increase in the absorption peak around a wavenumber of 1500 cm$^{-1}$ due to a cross-linking reaction.

5. Calculation of Percentage of Cross-Linking

Figure 2:
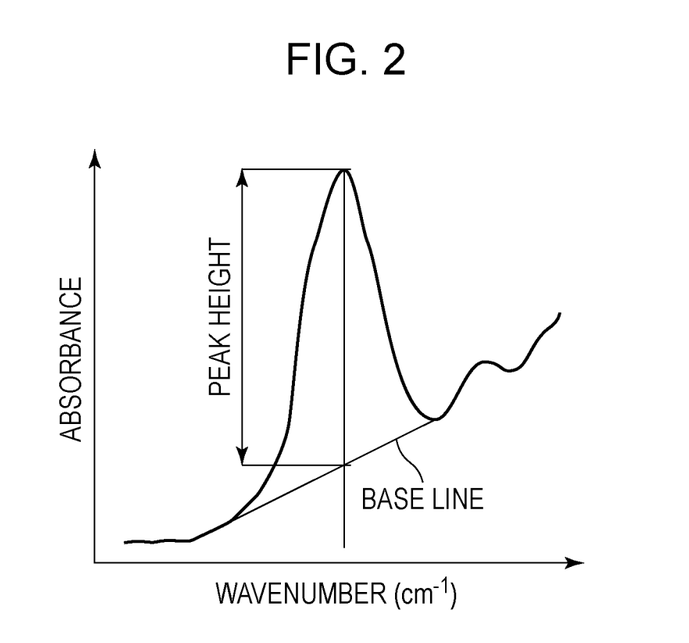
FIG. 2 illustrates determination of the peak height of a spectrum.

A shaped product was analyzed with a Fourier transform infrared spectrometer (Spectrum One manufactured by PerkinElmer, Inc.) by an attenuated total reflection (ATR) method. The absorption peak around a wavenumber of 2920 cm$^{-1}$ was normalized to 0.1, and then a percentage of cross-linking was determined from the ratio of the peak height around a wavenumber of 1470 cm$^{-1}$ after a cross-linking process to the peak height around a wavenumber of 1470 cm$^{-1}$ before a cross-linking process. In particular, a percentage of cross-linking was obtained from Calculation Formula (1). In order to determine the peak height of an absorption spectrum, as illustrated in FIG. 2, a base line was defined relative to the peak, the perpendicular line was drawn from the tip of the peak, and the distance from the intersection point of the perpendicular line and the base line to the tip of the peak was determined as the peak height of the absorption spectrum.

$$\text{Percentage of Cross-linking}(\%) = 100 \times [1 - [BCB_x / BCB_0]] \quad (1)$$

($BCB_x$: the peak height around a wavenumber of 1470 cm$^{-1}$ after a cross-linking process, $BCB_0$: the peak height around a wavenumber of 1470 cm$^{-1}$ before a cross-linking process)

6. Measurement of Volume-Average Particle Size

The volume-average particle size of inorganic particles contained in a dispersion liquid after a surface treatment process was measured with a dynamic light scattering (DLS) particle size distribution analyzer ZETASIZER Nano-S (manufactured by Malvern Instruments Ltd).

7. Measurement of Weight Fraction of Organic or Inorganic Material

A differential thermal/thermogravimetric simultaneous analyzer (Thermo Plus TG8120, manufactured by Rigaku Corporation) was used, and temperature was increased from 30° C. to 900° C. under nitrogen flow (200 mL/min) at a rate of temperature increase of 10° C./min. In the case where the weight fraction of an organic material was measured, the reduction rate of weight at 600° C. to weight at 30° C. was determined as the weight fraction of the organic material in a sample. In the case where the weight fraction of an inorganic material was measured, the residual rate of weight at 900° C. to weight at 30° C. was determined as the weight fraction of the inorganic material in a sample.

Example 1

Synthesis of 1-triethoxysilyl-2-(4-benzocyclobutenyl)ethane (BCB-Si)

Into a 100 ml two-necked flask having a magnetic stirrer and purged with nitrogen gas, 3.00 g (23.0 mmol) of 4-vinylbenzocyclobutene and 0.5 g of a Karstedt's catalyst (containing 2 weight % of platinum) were added, and then the two-necked flask was placed into an ice bath. In a state in which this solution was slowly stirred, 8.78 g (53.5 mmol) of triethoxysilane was gradually added dropwise thereto. The two-necked flask was taken from the ice bath in five minutes after the addition of triethoxysilane, and the content in the flask was stirred for 20 hours at room temperature. The resulting solution was purified by distillation under reduced pressure to yield 4.27 g (14.5 mmol) of 1-triethoxysilyl-2-(4-benzocyclobutenyl)ethane that was the specified substance.

Result of Structural Identification by $^1$H-NMR $^1$H NMR (400 MHz, CDCl$_3$): δ 7.34-7.02 (d, 1H), 6.94 (d, 1H), 6.92 (s, 1H), 3.83 (q, 6H), 3.12 (s, 4H), 2.72-2.68 (m, 2H), 1.23 (t, 9H), 1.00-0.95 (m, 2H)

Example 2

Synthesis of BCB-Si-coated Alumina Particles

Components

Inorganic particles: alumina particles (TM-300, manufactured by TAIMEI CHEMICALS CO., LTD., average primary particle size: 7 nm) 3.0 g Compound of the present invention: BCB-Si (Example 1) 2.5 g Dispersion aid: decyltrimethoxysilane (manufactured by Shin-Etsu Chemical Co., Ltd.) 0.5 g Additive: triethylamine (NEt$_3$) 0.1 g Organic solvent: tetrahydrofuran (THF) 25 g The mixture of these components was put into a 100 ml zirconia vessel and then subjected to a preliminary treatment with a bead mill disperser (UAM-015, manufactured by AIMEX CO., Ltd.) at a rotation speed of 650 rpm for 10 minutes. After the preliminary treatment, the resulting mixture was further subjected to the main treatment with 104 parts of zirconia beads having a diameter of ϕ 30 um (filling rate of 50%) at a rotation speed of 1600 rpm for 360 minutes. The resulting slurry was filtered to remove the zirconia beads and then subjected to centrifugal separation (8000 G×10 minutes) to precipitate coarse particles. The supernatant liquid of the product was added dropwise to methanol to generate powder precipitate. The powder was collected, and then the collected powder was washed several times with methanol. The resulting powder was vacuum-dried at 40° C. for 18 hours to obtain alumina particles coated with BCB-Si. The BCB-Si-coated alumina particles were dispersed in THF to measure its dispersed particle size by DLS, and the result of the measurement was 18 nm. The amount of the organic material contained in the BCB-Si-coated alumina particles for coating the alumina particles was measured by thermogravimetry-differential thermal analysis (TG-DTA), which showed that the BCB-Si-coated alumina particles contained 36 weight % of the organic material. Furthermore, absorption derived from benzocyclobutenyl group was detected by IR.

Example 3

Synthesis of Cross-linked BCB-Si-coated Alumina Particles

Figure 3:
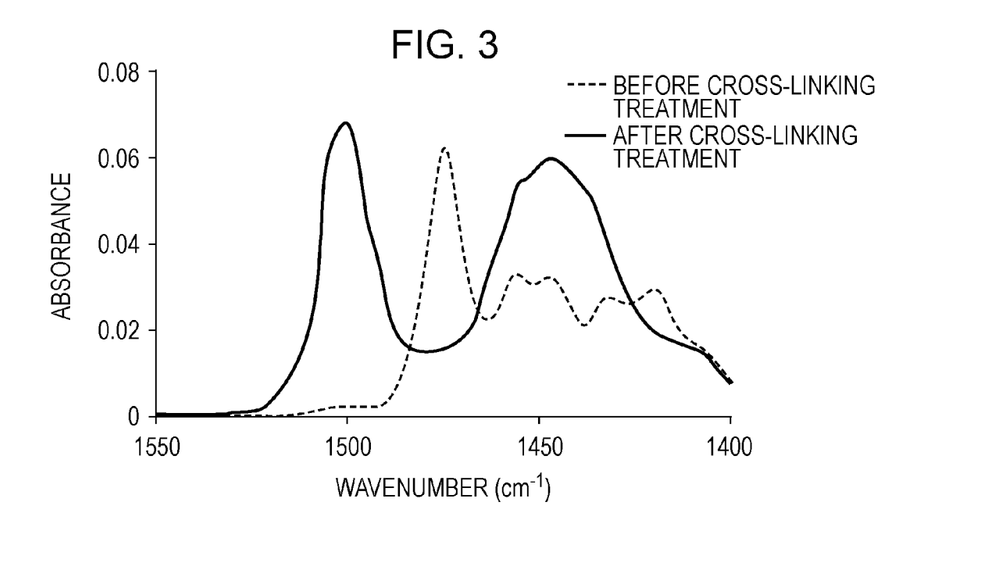
FIG. 3 illustrates IR spectra of BCB-Si-coated cross-linked alumina particles in Example 3.

Into a cylindrical die (diameter: 10 mm×height: 1.2 mm), 300 mg of the BCB-Si-coated alumina particles prepared in Example 2 were put and cross-linked under vacuum at a pressure of 20 MPa and 280° C. for an hour. In the shaped product of the cross-linked BCB-Si-coated alumina particles, absorption derived from a cross-linked structure was detected by IR. FIG. 3 illustrates the IR spectra of the BCB-Si around wavenumbers from 1400 cm$^{-1}$ to 1550 cm$^{-1}$ in Example 3. The percentage of cross-linking in the cross-linked BCB-Si-coated alumina particles of Example 3 was substantially 100%, and the linear expansion coefficient was 8 ppm/° C.

Example 4

Synthesis of Composite Composition of 5-(4-benzocyclobutenyl)-2-norbornene-dicyclopentadiene Copolymer (copolymer P1) and BCB-Si-coated Alumina Particles To 5 ml of THF, 300 mg of a copolymer P1 [Mn=6.6×10$^3$, Mw=1.4×10$^4$, repeating unit derived from 5-(4-benzocyclobutenyl)-2-norbornene: repeating unit derived from dicyclopentadiene=34 mol %:66 mol %] and 300 mg of BCB-Si-coated alumina particles prepared in Example 2 were added, and the mixture was subjected to an ultrasonic treatment for 10 minutes to prepare a homogeneous solution. This solution was added dropwise to 100 ml of methanol to precipitate a composite composition of the copolymer P1-alumina particles. The precipitated composite composition was collected and dried with a vacuum drier at 40° C. for 12 hours.

Example 5

Figure 4:
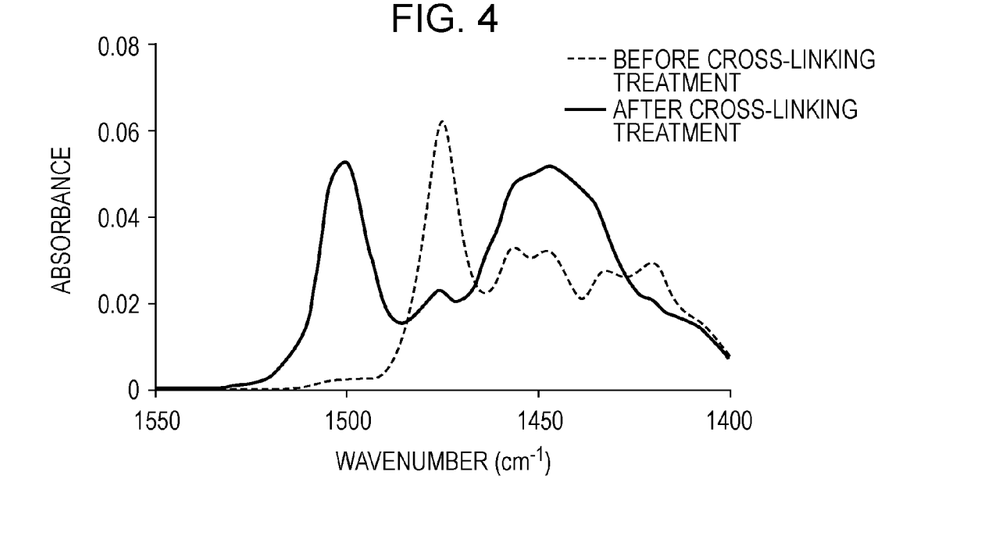
FIG. 4 illustrates IR spectra of a cross-linked composite composition of a copolymer P1 and BCB-Si-coated alumina particles in Example 5.

Synthesis of Cross-linked Composite Composition of Copolymer P1 and BCB-Si-coated Alumina Particles Into a cylindrical die (diameter: 10 mm×height: 1.2 mm), 200 mg of the organic-inorganic composite composition prepared in Example 4 were put and cross-linked under vacuum at a pressure of 20 MPa and 280° C. for an hour. In the cross-linked product, absorption derived from a cross-linked structure was detected by IR. FIG. 4 illustrates the IR spectra of the cross-linked organic-inorganic composite composition of Example 5 around wavenumbers from 1400 cm$^{-1}$ to 1550 cm$^{-1}$. The percentage of cross-linking in the cross-linked organic-inorganic composite composition of Example 5 was 87%, and the linear expansion coefficient was 42 ppm/° C. The inorganic content in the cross-linked organic-inorganic composite composition was 42 weight %.

Reference Example 1

Synthesis of Decyltrimethoxysilane-coated Alumina Particles

Except that the amount of the BCB-Si as the compound of the present invention was changed to 0 g and that the amount of decyltrimethoxysilane was changed to 3.0 g, decyltrimethoxysilane-coated alumina particles were prepared through the same process as employed in Example 2. The decyltrimethoxysilane-coated alumina particles were dispersed in THF to measure its dispersed particle size by DLS, and the result of the measurement was 20 nm. The amount of the organic material contained in the decyltrimethoxysilane-coated alumina particles for coating the alumina particles was analyzed by TG-DTA, which showed that the decyltrimethoxysilane-coated alumina particles contained 40 weight % of the organic material.

Comparative Example 1

Except that the decyltrimethoxysilane-coated alumina particles prepared in Reference Example 1 were used in place of the BCB-Si-coated alumina particles, the same process as employed in Example 3 was carried out. A shaped product formed from the organic-inorganic composite particles had a linear expansion coefficient of 13 ppm/° C.

Comparative Example 2

Except that 200 mg of the copolymer P1 was used and that 300 mg of the decyltrimethoxysilane-coated alumina particles prepared in Reference Example 1 were used in place of the BCB-Si-coated alumina particles, the same process as employed in Example 5 was carried out. A shaped product formed from the resulting organic-inorganic composite composition had a linear expansion coefficient of 54 ppm/° C. The inorganic content in the organic-inorganic composite composition was 42 weight %.

Table 1 shows the details of Examples 3 and 5 and Comparative Examples 1 and 2.

TABLE 1

|  | Organic-inorganic composite particles | Weight fraction of organic material in organic-inorganic composite particles | Polymer | Linear expansion coefficient of cross-linked particles and cross-linked product | Percentage of cross-linking | Weight fraction of organic material in cross-linked particles and cross-linked product |
| --- | --- | --- | --- | --- | --- | --- |
| Example 3 | BCB—Si(OEt)$_3$-coated alumina particles | 36 weight % | none | 8 ppm | Substantially 100% | 36 weight % |
| Comparative Example 1 | Decyltrimethoxysilane-coated alumina particles | 40 weight % | none | 13 ppm | 0% | 40 weight % |
| Example 5 | BCB—Si(OEt)$_3$-coated alumina particles | 36 weight % | Copolymer P1 | 42 ppm | 87% | 58 weight % |
| Comparative Example 2 | Decyltrimethoxysilane-coated alumina particles | 40 weight % | Copolymer P1 | 54 ppm | 0% | 23 weight % |

As shown in Table 1, a linear expansion coefficient was at least 20% lower in the cross-linked organic-inorganic composite particles and cross-linked organic-inorganic composite composition of Examples than in those prepared without the compound used in Examples.

In the present invention, the cross-linked organic-inorganic composite particles coated with the benzocyclobutene compound and the cross-linked organic-inorganic composite composition prepared by cross-linking the organic-inorganic composite composition each have a low linear expansion coefficient and thus can be used for forming optical devices or in other applications.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-143887 filed Jun. 27, 2012, which is hereby incorporated by reference herein in its entirety.

What is claimed is:

1. A benzocyclobutene compound represented by Formula (1)

(1)

where n is an integer from 0 to 2, $R_1$ and $R_2$ are each independently selected from the group consisting of a hydrogen atom and a saturated hydrocarbon group having 1 to 5 carbon atoms, and A is selected from the group consisting of a direct bond and a substituted or unsubstituted chain saturated divalent hydrocarbon group having 1 to 20 carbon atoms.

2. The compound according to claim 1, wherein A is a direct bond or an unsubstituted chain saturated divalent hydrocarbon group having 1 to 10 carbon atoms.

3. An organic-inorganic composite particle comprising:
an inorganic particle; and
an organic compound coating the inorganic particle, wherein
the organic compound is represented by Formula (2)

(2)

where a is an integer from 0 to 3; b is an integer from 0 to 3; c is an integer from 1 to 3; a, b, and c are integers which satisfy the relationship of a+b+c=3; $R_1$ and $R_2$ are each independently selected from the group consisting of a hydrogen atom and a saturated hydrocarbon group having 1 to 5 carbon atoms; A is selected from the group consisting of a direct bond and a substituted or unsubstituted chain saturated divalent hydrocarbon group having 1 to 20 carbon atoms; and * represents a bond and is linked to the inorganic particle.

4. The organic-inorganic composite particle according to claim 3, wherein A is a direct bond or an unsubstituted chain saturated divalent hydrocarbon group having 1 to 10 carbon atoms.

5. An organic-inorganic composite composition comprising:

the organic-inorganic composite particle according to claim 3; and a polymer containing a repeating unit represented by any of Formulae (5) to (14)

(5)

(6)

(7)

(8)

(9)

(10)

(11)

-continued (12)

(13)

(14)

where Formulae (5) to (14) each represent a repeating unit of a polymer, where $R_5$ to $R_8$ and $R_{10}$ and $R_{11}$ are each independently selected from the group consisting of a hydrogen atom and a hydrocarbon group having 1 to 20 carbon atoms; in this case, at least one of $R_5$ to $R_8$, $R_9$, and at least one of $R_{10}$ and $R_{11}$ are represented by Formula (15); and s, t, and u are each independently an integer of 0 or 1

(15)

where C is selected from the group consisting of a direct bond and a substituted or unsubstituted chain saturated divalent hydrocarbon group having 1 to 20 carbon atoms, and * represents a bond and is linked to the repeating unit represented by any of Formulae (5) to (14).

6. The organic-inorganic composite composition according to claim 5, wherein the repeating unit of the polymer has a structure represented by Formula (5), (6), (7), or (14).

7. The organic-inorganic composite composition according to claim 5, wherein C in Formula (15) is a direct bond or an unsubstituted chain saturated divalent hydrocarbon group having 1 to 10 carbon atoms.

8. The organic-inorganic composite composition according to claim 5, wherein the repeating unit of the polymer has a structure represented by Formula (5), (6), (7), or (14), and C in Formula (15) is a direct bond or an unsubstituted chain saturated divalent hydrocarbon group having 1 to 10 carbon atoms.

9. A cross-linked organic-inorganic composite composition prepared by cross-linking the organic-inorganic composite composition according to claim 5.

10. The cross-linked organic-inorganic composite composition according to claim 9, wherein the cross-linked organic-inorganic composite composition has a structure represented by any of Formulae (16) to (25)

(16)

(17)

(18)

(19)

(20)

(21)

(22)

(23)

(24)

(25)

where $R_{12}$ to $R_{15}$ and $R_{17}$ and $R_{18}$ are each independently selected from the group consisting of a hydrogen atom, a halogen atom, a hydrocarbon group which optionally contains a substituent and which has 1 to 20 carbon atoms, and a substituent containing a silicon atom, an oxygen atom, or a nitrogen atom; in this case, at least one of $R_{12}$ to $R_{15}$, $R_{16}$, and at least one of $R_{17}$ and $R_{18}$ are each a structure represented by Formula (26); and x, y, and z are each independently an integer of 0 or 1

(26)

where D is selected from the group consisting of a direct bond and a substituted or unsubstituted chain saturated divalent hydrocarbon group having 1 to 20 carbon atoms, * represents a bond and is linked to the repeating unit represented by any of Formulae (16) to (25), $L_3$ and $L_4$ each independently represent a hydrogen atom or a structure represented by Formula (27), and any one of $L_3$ and $L_4$ is the structure represented by Formula (27)

(27)

where g is an integer from 0 to 3; h is an integer from 0 to 3; i is an integer from 1 to 3; g, h, and i are integers which satisfy the relationship of g+h+i=3; $R_{19}$ and $R_{20}$ are each independently selected from the group consisting of a hydrogen atom and a saturated hydrocarbon group having 1 to 5 carbon atoms; E is selected from the group consisting of a direct bond and a substituted or unsubstituted chain saturated divalent hydrocarbon group having 1 to 20 carbon atoms; $*_3$ and $*_4$ each represent a bond; $*_3$ is linked to the aromatic ring in Formula (26); and $*_4$ is linked to the inorganic particle.

11. The cross-linked organic-inorganic composite composition according to claim 10, wherein the cross-linked organic-inorganic composite composition has a structure represented by Formula (16), (17), (18), or (25).

12. The cross-linked organic-inorganic composite composition according to claim 10, wherein D in Formula (26) and E in Formula (27) are each independently a direct bond or an unsubstituted chain saturated divalent hydrocarbon group having 1 to 10 carbon atoms.

13. The cross-linked organic-inorganic composite composition according to claim 10, wherein the cross-linked organic-inorganic composite composition has a structure represented by Formula (16), (17), (18), or (25), and D in Formula (26) and E in Formula (27) are each independently a direct bond or an unsubstituted chain saturated divalent hydrocarbon group having 1 to 10 carbon atoms.

14. An optical device comprising the cross-linked organic-inorganic composite composition according to claim 9.

15. An optical device comprising the organic-inorganic composite composition according to claim 5.

16. An optical device comprising the organic-inorganic composite particle according to claim 3.

17. The optical device according to claim 16, wherein the optical device is a lens.

18. A cross-linked organic-inorganic composite particle comprising:
an inorganic particle; and
an organic compound coating the inorganic particle, wherein
the organic compound is represented by Formula (3)

(3)

where a is an integer from 0 to 3; b is an integer from 0 to 3; c is an integer from 1 to 3; a, b, and c are integers which satisfy the relationship of a+b+c=3; $R_1$ and $R_2$ are each independently selected from the group consisting of a hydrogen atom and a saturated hydrocarbon group having 1 to 5 carbon atoms; A is selected from the group consisting of a direct bond and a substituted or unsubstituted chain saturated divalent hydrocarbon group having 1 to 20 carbon atoms; * represents a bond and is linked to the inorganic particle; $L_1$ and $L_2$ each independently represent a hydrogen atom or a structure represented by Formula (4); and any one of $L_1$ and $L_2$ is a structure represented by Formula (4)

(4)

where d is an integer from 0 to 3; e is an integer from 0 to 3; f is an integer from 1 to 3; and d, e, and f are integers which satisfy the relationship of d+e+f=3; $R_3$ and $R_4$ are each independently selected from the group consisting of a hydrogen atom and a saturated hydrocarbon group having 1 to 5 carbon atoms; B is selected from a group consisting of a direct bond and a substituted or unsubstituted chain saturated divalent hydrocarbon group having 1 to 20 carbon atoms; $*_1$ and $*_2$ each represent a bond; $*_1$ is linked to the aromatic ring in Formula (3); and $*_2$ is linked to the inorganic particle.

19. The cross-linked organic-inorganic composite particle according to claim 18, wherein A in Formula (3) and B in Formula (4) are each a direct bond or an unsubstituted chain saturated divalent hydrocarbon group having 1 to 10 carbon atoms.

20. An optical device comprising the cross-linked organic-inorganic composite particle according to claim 18.

* * * * *